United States Patent [19]

Seaman et al.

[11] Patent Number: 4,628,727

[45] Date of Patent: Dec. 16, 1986

[54] FUEL INJECTION NOZZLES

[75] Inventors: Robert B. Seaman, Cirencester; Keith E. Horne, Cricklade, both of England

[73] Assignee: Lucas Industries Public Limited Company, Birmingham, England

[21] Appl. No.: 798,371

[22] Filed: Nov. 15, 1985

[30] Foreign Application Priority Data

Nov. 29, 1984 [GB] United Kingdom ................. 8430150

[51] Int. Cl.[4] ............................................ G01M 15/00

[52] U.S. Cl. .................................................. 73/119 A

[58] Field of Search .......... 200/83 Q, DIG. 31, 82 A, 200/82 D, 81 R; 239/533.2, 533.3, 584, 585; 73/119 A

[56] References Cited

U.S. PATENT DOCUMENTS 4,181,010 1/1980 Knape et al. ...................... 200/82 D 4,206,635 6/1980 Teerman ........................... 73/119 A 4,335,601 6/1982 Buck et al. ........................ 73/119 A 4,414,845 11/1983 Hofmann ........................... 73/119 A

*Primary Examiner*—Stewart J. Levy

*Assistant Examiner*—Robert R. Raevis

[57] ABSTRACT

A fuel injection nozzle of the inwardly opening type includes a switch means operable to provide a signal indicative of when the valve member of the nozzle is lifted from its seating to start fuel delivery. The switch means includes a first member secured in the housing of the nozzle, a second member movable with the valve member and a third member slidable on the first member to define a damping chamber into which the second member extends. The second member has a head which with a step defined by the third member forms the contacts of a switch. A spring biases the third member in the direction to close said contacts. When the valve member lifts from its seating the head separates from the step to open the contacts and the damping chamber restricts the movement of the third member to close the contacts.

12 Claims, 4 Drawing Figures

FUEL INJECTION NOZZLES

This invention relates to fuel injection nozzles for supplying fuel to an internal combustion engine in particular a compression ignition engine, the nozzle being of the kind comprising a valve member which is resiliently loaded into contact with a seating and which is movable away from the seating by the action of fuel under pressure, to allow fuel flow from an inlet of the nozzle to an outlet thereof.

In order to achieve increased economy in the consumption of fuel and a reduced level of noxious gas in the engine exhaust, it is necessary to control very precisely the instant of fuel delivery through the aforesaid outlet. The apparatus which supplies fuel to the nozzle would incorporate means whereby the instant of fuel delivery to the nozzle can be controlled and in some cases sensed. However, fuel delivery from the outlet of the nozzle does not occur as soon as fuel is delivered by the apparatus. The delay depends upon a number of factors some of which are variable in nature.

It has been realized that the instant of delivery of fuel to the engine can be determined by obtaining a signal from the injection nozzle as to when the valve member lifts from the seating. Various ways of deriving a signal are known in the art ranging from simple switch devices to more complex capacitive or inductive sensors. The simple switch devices have the advantage that the signal is relatively immune to interference. However, they can upset the operation of the nozzle and require careful initial adjustment and are prone to wear.

The object of the invention is to provide in a fuel injection nozzle switch means whereby a signal is generated upon lifting of the valve member from the seating.

According to the invention switch means for incorporation in a nozzle of the kind specified comprises a first member mounted in use on a fixed part of the nozzle, a second member which in use is coupled to and is moved towards the first member as the valve member of the nozzle is lifted from the seating, a third member movable relative to the first and second members, electrical contacts on said second and third members, resilient means acting on said third member to urge said contacts into engagement, and a damping chamber acting to restrain the movement of the third member by said resilient means, the arrangement being such that when the valve member is lifted from its seating the second member will move to separate said contacts the movement of the third member being restrained by said damping chamber.

Figure 1:
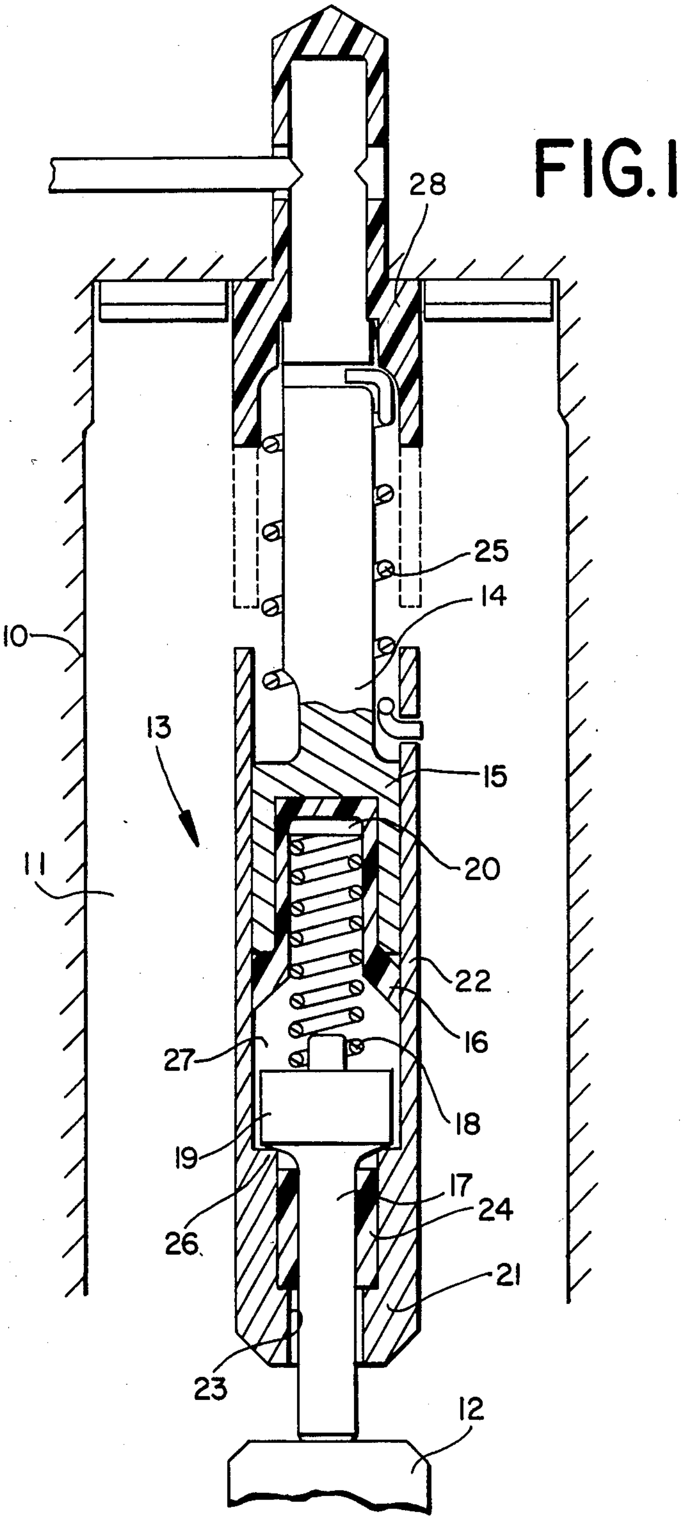
FIG. 1 shows a switch means in partial side elevation and in position in the body of a fuel injection nozzle.

Examples of switch means in accordance with the invention will now be described with reference to the four accompanying drawings each of which shows the respective switch means in partial side elevation and in position in the body of a fuel injection nozzle. Referring to FIG. 1 of the drawings a nozzle holder 10 of an inwardly opening fuel injection nozzle defines a chamber 11 into which extends the end of a valve member (not shown) remote from a seating. The end of the valve member mounts a spring abutment part of which is seen at 12 and which carries one end of a coiled compression spring (not shown), which urges the valve member into contact with the seating. The construction described above is well known in the art and the valve member is lifted from its seating by the action of fuel under pressure supplied from a high pressure fuel pump.

In order to provide an indication of when the valve member is lifted from the seating a switch means generally indicated at 13 is provided, the switch means being located within the chamber 11. The switch means comprises a first member 14 which is secured within the nozzle holder coaxially with the axis of movement of the valve member. The first member defines a hollow skirt portion 15 within which is located a generally cup-shaped electrical insulating member 16.

Also provided is a second member which in the example comprises a rod 17 and this is biased into contact with the spring abutment 12 by a coiled compression spring 18 one end of which bears against a head 19 on the second member and the other end of which engages a washer 20 which locates against the base of the insulating member 16. The spring 18 is of sufficient strength to urge the rod 17 into engagement with the spring abutment at all times. The rod 17 is therefore effectively coupled to the spring abutment and if so desired, the spring 18 can be omitted and the rod secured to the abutment 12 as by a screw thread connection. In this case the member 14 need not be hollow and there is no need for the insulating member 16.

A third member 21 is provided and this of generally cup-shaped form having a sleeve portion 22 which is slidable about the cup-shaped portion 15 of the first member 14. The rod 17 extends in spaced relationship, through an aperture 23 in the base wall of the member 21 and an insulating sleeve 24 guides the movement of the rod 17 relative to the member 21. The member 22 is biased by a coiled tension spring 25 away from the spring abutment so as to ensure that an internal shoulder 26 defined by the member 21 is urged into engagement with the head 19. The force exerted by the tension spring is less than that exerted by the spring 18. In the rest position therefore an electrical connection will exist between the second member 17 and the third member 21. The three members define a damping chamber 27 which is filled with fuel which has leaked along the working clearance defined between the valve member of the nozzle and the wall of its bore. When therefore the valve member lifts from its seating, the head 19 will tend to move away from the shoulder 26 to break the electrical connection therebetween. In addition, since the volume of the chamber 27 will be effectively reduced by the fact that the rod 17 is moved into the chamber, a fuel pressure will be developed in the chamber which will act upon the base wall of the member 21 which base wall effectively includes the end wall of the insulator 24, to urge the member 21 against the action of the spring 25 thereby causing further separation of the shoulder 26 from the head 19. When the valve member moves back into contact with its seating at the end of fuel delivery, the members are restored to their original positions so that electrical contact is once more established between the head 19 and the shoulder 26. The member 14 is mounted in insulating relationship with the body 10 of the holder by means of an insulator 28 and the spring 25 affords a reliable electrical connection between the member 21 and the member 14. The member 14 since it extends exterior of the chamber 11, can therefore be used to effect an electrical connection to the switch means, the return being by way of the body of the holder.

The construction described is self-adjusting for any wear which may take place either at the contacting surfaces of the valve member and its seating and/or the contacting surfaces of the head 19 and the shoulder 26. Wear of the valve member and its seat will mean that the rod 17 will move downwardly either under the action of the spring 18 or directly if the rod is secured to the valve member and the member 21 will follow this movement drawing fuel into the damping chamber 27 along the various working clearances. If the switch surfaces wear then the member 21 will move upwardly under the action of the spring 25.

There will of course be leakage of fuel from the damping chamber 27 and it is important to ensure that the leakage is not sufficient to allow the third member 21 to move into contact with the head 19 under the action of the spring 25 while the valve member is held in the open position during delivery of fuel. This can be prevented by providing a stop shown in dotted outline in FIG. 1 to limit the movement of the member 21 under the action of the spring 25.

Figure 2:
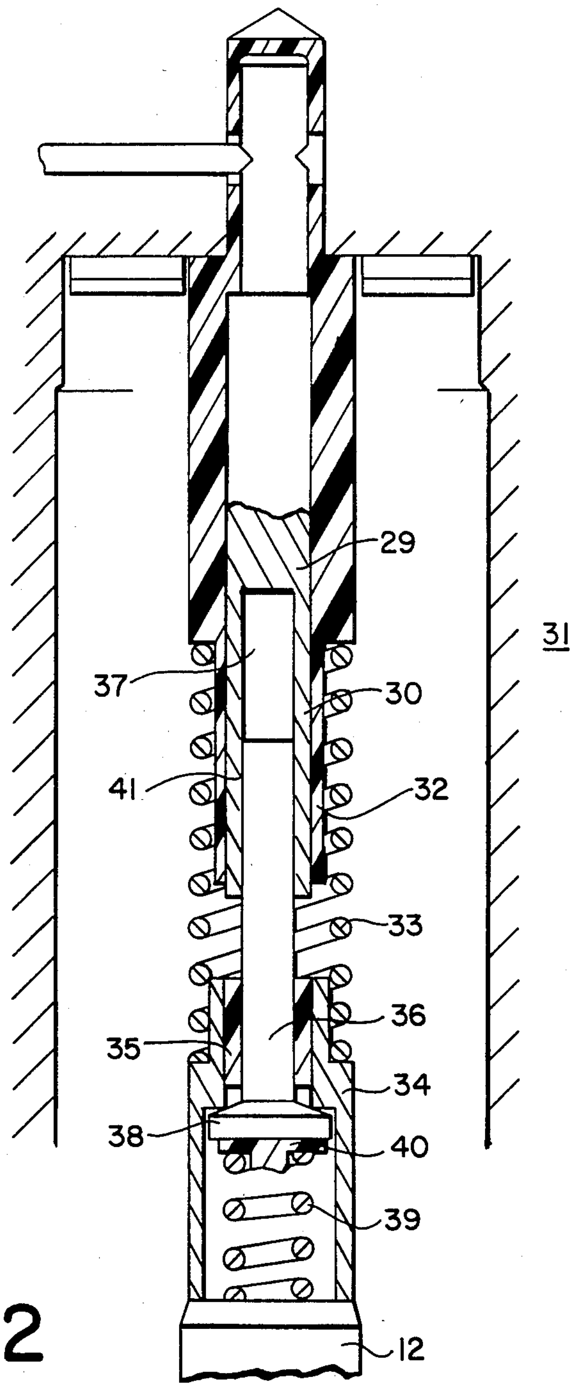
FIG. 2 shows a second embodiment of the switch means.

In the example shown in FIG. 2 a first member 29 has a skirt portion 30 defining a bore and is mounted in electrically insulated relationship within the body 31 of the nozzle. Surrounding the skirt portion is a sleeve 32 formed from insulating material and defining a step against which is located one end of a coiled spring 33.

The spring 33 engages a second member 34 of hollow cylindrical form and urges the member into contact with the spring abutment 12. Supported within the member 34 is a bush 35 formed from electrically insulating material and slidable within the bush is a third member 36 in the form of a rod, the rod extending partly within the bore defined by the skirt portion 30 to define therewith a damping chamber 37. The rod 36 is provided with a head 38 and this is biased into contact with a step defined in the member 34, by means of a coiled spring 39 which is weaker than the spring 33. The spring 39 has one end in engagement with the spring abutment 12 but its other end is electrically insulated from the head 38 by an insulating washer 40. A controlled leakage path 41 connects the damping chamber 37 with the interior of the nozzle, the chamber being maintained full of fuel.

In operation, when the spring abutment 12 moves upwardly as shown in the drawing the member 34 moves therewith and separation of the head 38 from the step in the member 34 thereby breaking the electrical connection therebetween. The rod 36 is urged upwardly by the spring 39 to follow the member 34 but the leakage of fuel from the chamber 37 is so slow that the delivery of fuel will be completed before it has time to re-engage with the step. When the valve member of the nozzle is returned into contact with its seating the spring 33 will act to maintain contact between the member 34 and the abutment 12. As wear takes place automatic compensation is achieved by the fact that fuel can flow into the damping chamber 37 if wear of the valve member of the nozzle takes place or out of the chamber if wear takes place between the electrical contacts defined by the head 38 and the step defined in the member 34.

Figure 3:
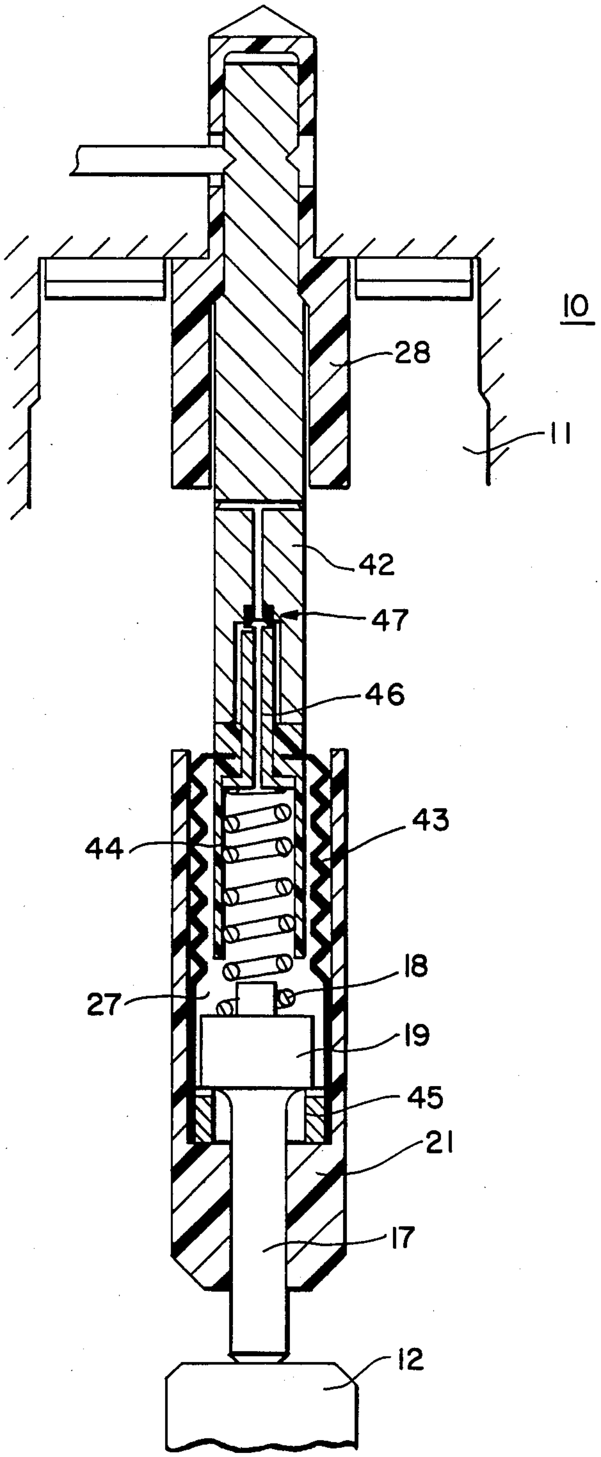
FIG. 3 shows a modification of the switch means of FIG. 1.

The example shown in FIG. 3 is a modification of the example shown in FIG. 1 and identical reference numerals are used wherever possible. In this example the first member includes a rod 42 which extends into the chamber 11 defined in the nozzle body, the rod being supported by the insulator 28. The first member also includes a tubular bellows 43 which is formed from metal and is electrically connected to the rod 42 although the end of the bellows adjacent the rod is carried by an insulating sleeve 44 extending within the bellows 43. At its lower end the bellows has a generally right cylindrical portion which carries an annular contact member 45 for engagement by the head 19 of the rod portion of the second member 17. The rod portion of the second member 17 passes through the third member 21 which in this case is formed from insulating material and is secured to the right cylindrical portion of the bellows 43. The damping chamber 27 is defined by the bellows 43 and the member 21. The second member 17 is biased into contact with the spring abutment 12 by the spring 18. The spring 18 is restrained against contact with the bellows by the sleeve 44. At its end remote from the second member 17 the spring 18 engages a spring support 46 which is located in insulating relationship relative to the rod 42. The support has a central passage through which the chambers 11 and 27 communicate with each other, a restrictor 47 being provided to limit the rate of fuel flow. In use, when the valve member of the nozzle is lifted from its seating the member 17 is forced into the chamber 27 causing the fuel therein to be pressurized and also breaking the electrical connection between the head 19 and the member 45. The fuel pressure causes the third member 21 to move downwardly against the natural resilience of the bellows 43 to further separate the head 19 and the annular member 45. Fuel can flow from the chamber 27 through the passage defined in the spring support 46 and the passage in the rod 42. The rate of flow of fuel is however determined by the restrictor which is chosen to ensure that electrical contact between the head 19 and member 45 is only re-established during the closing movement of the nozzle valve member.

Figure 4:
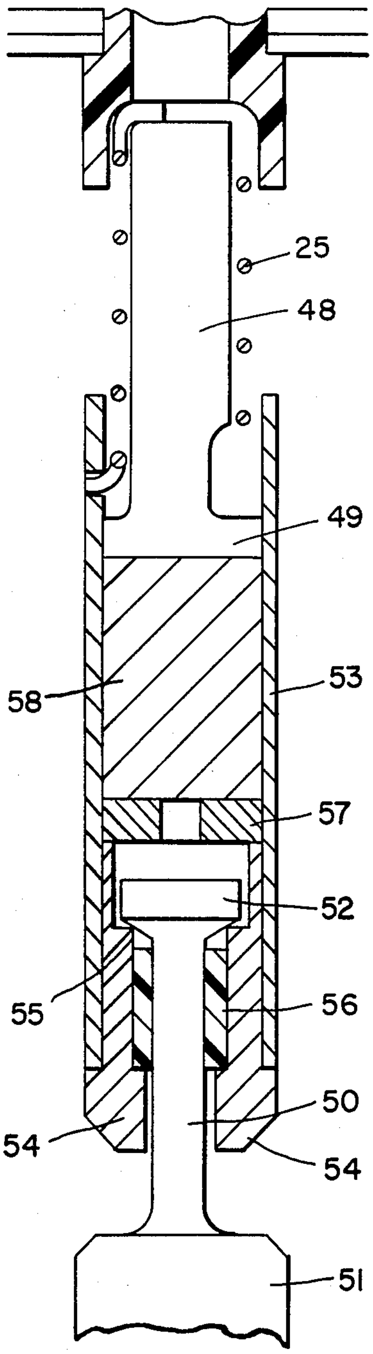
FIG. 4 shows a further embodiment of the switch means.

FIG. 4 shows a further example which incorporates an alternative construction mentioned in respect of the example of FIG. 1. In the example of FIG. 4 the first member 48 has a disc like end plate 49, the member being supported in electrically insulating relationship in the nozzle body. The second member is in the form of a rod 50 integral with the spring abutment 51, the rod carrying a head 52 at its end remote from the abutment. The third member includes a tube 53 slidable on the plate 49 and biased away from the abutment by a tension spring 25. The third member further includes at least two inserts 54 formed from electrically, conductive material and which are located and retained within the end of the tube 53 adjacent the abutment. The inserts may be retained in position after they have been located about the rod 50, as by crimping the tube 53 or by means of adhesive. The inserts define a shoulder 55 for engagement with the head 52 and carry electrically insulating members 56 for engagement with the rod 50 to guide the relative movement of the second and third members.

The inserts 54 at their ends remote from the spring abutment engage an apertured washer 57 and interposed between the washer and the plate 49 is a prestressed open foam rubber or like body 58, the interstices of the foam forming a damping chamber.

The operation of the switch means is substantially identical to that of the example of FIG. 1. As the valve member of the nozzle is lifted separation of the head 52 from the shoulder 55 takes place thereby breaking the electrical contacts formed thereby to provide a signal indicative of opening of the valve member. As with the example of FIG. 1 as the rod 50 enters into the chamber surrounding the head 52 the volume of the chamber will tend to be reduced with the result that the third member i.e. the tube and inserts will move against the action of the spring 25. However, leakage of fuel into and out of the chamber can more readily occur than with the example of FIG. 1 with the result that the third member may tend to follow the movement of the head 52. The movement of the third member is however damped by the compression of the foam body 58 so that electrical connection between the inserts and the head is not re-established until the valve member of the nozzle is moving towards its closed position following delivery of fuel.

An example of a fuel injection nozzle in which the examples of switch means described above can be incorporated is shown in the specification of British Pat. No. 1586254.

We claim:

1. A fuel injection nozzle for supplying fuel to an internal combustion engine comprising a valve member which is resiliently loaded into contact with a seating and which is movable away from the seating by the action of fuel under pressure to allow fuel flow from an inlet to an outlet, switch means for providing a signal indicative of when the valve member has been lifted from the seating, said switch means comprising a first member mounted on a fixed part of the nozzle, a second member which is coupled to and is moved towards the first member as the valve member of the nozzle is lifted from the seating, a third member movable relative to the first and second members, electrical contacts on said second and third members, resilient means acting on said third member to urge said contacts into engagement, and a damping chamber defined by at least two of said members acting to restrain the movement of the third member by said resilient means, the arrangement being such that when the valve member is lifted from its seating the second member will move to separate said contacts, the movement of the third member being restrained by said damping chamber.

2. A nozzle according to claim 1 in which said third member is of tubular form and is slidable about said first member, said second member being slidably mounted in an end of said third member remote from the first member, said second member defining a head at its end within the third member, said head and a step defined on the internal surface of said third member forming said contacts, and means electrically insulating said second member from said third member other than through said contacts.

3. A nozzle according to claim 2 in which said resilient means comprises a coiled tension spring acting between said first and third members.

4. A nozzle according to claim 2 or claim 3 including further resilient means acting intermediate said first member and said second member, said further resilient means urging said second member into contact with a part movable with said valve member.

5. A nozzle according to claim 4 in which said further resilient means comprises a coiled compression spring, and an electrical insulator disposed to prevent said compression spring forming an electrical connection between said first and second members.

6. A nozzle according to claim 2 or claim 3 in which said second member is integrally formed with a part movable with said valve member, said third member comprising a tube and a plurality of inserts which can be assembled around the second member and then located and retained in the end of the tube adjacent the second member, said inserts defining the step in said third member.

7. A nozzle according to claim 1 in which said damping chamber is constituted by a prestressed open foam body which is compressed during movement of the third member under the action of said resilient means.

8. A nozzle according to claim 7 in which said foam body is mounted within said third member and is located between said first member and a part coupled to said third member whereby when said third member moves relative to said first member under the action of said resilient means said body will be compressed between said first member and said part.

9. A nozzle according to claim 1 including a bore defined in the first member, said third member extending into said bore and defining a head exterior of the bore, the bore defining said damping chamber with said third member, said second member being of hollow cylindrical form and surrounding said head, said second member defining an internal step which forms with said head said contacts, said resilient means comprising a coiled compression spring acting between said head and a part movable with said valve member, and further resilient means acting on said second member to maintain said second member in engagement with said part.

10. A nozzle according to claim 9 in which said second member is mounted in electrically insulating relationship about said third member, and insulating means is provided at one end of said compression spring to prevent direct electrical connection between said part and said head.

11. A nozzle according to claim 1 in which said damping chamber is in part defined by a resilient metal bellows which is mounted at one end on said first member and at its other end is coupled to said third member, said second member being slidable supported in said third member and defining a head at its end remote from said valve member, said head forming one of said contacts and the other contact being defined by a part carried by said bellows, the resilience of said bellows forming said resilient means, and a restricted outlet from the interior of said bellows.

12. A nozzle according to claim 11 in which said third member defines a skirt surrounding said bellows, and said first member mounts an insulating sleeve extending within the bellows, said sleeve housing a coiled compression spring acting between said first and second members.

* * * * *